E. HANRAHAN.
Whiffletree-Hook.

No. 228,345.

Patented June 1, 1880.

Witnesses:
Sam' R. Turner
Edwin Baltzley

Inventor:
Edward Hanrahan,
By R.S. & A.P. Lacey
Att'ys

UNITED STATES PATENT OFFICE.

EDWARD HANRAHAN, OF WELLSVILLE, NEW YORK, ASSIGNOR OF ONE-HALF OF HIS RIGHT TO FRANK E. GALE, OF SAME PLACE.

WHIFFLETREE-HOOK.

SPECIFICATION forming part of Letters Patent No. 228,345, dated June 1, 1880.

Application filed October 23, 1879.

*To all whom it may concern:*

Be it known that I, EDWARD HANRAHAN, of Wellsville, in the county of Allegany and State of New York, have invented certain new and useful Improvements in Whiffletree-Clips; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to that class of whiffletree-hooks having two loops, one of which is fixed rigidly to the ferrule, while the other is hinged to the end thereof, and arranged so that when they are brought together they form a closed ring or loop; and it consists in a guard or spur rigidly attached to the hinged loop, so arranged with reference to the point of the rigid loop as to prevent the trace-ring from becoming unhitched.

Figure 1:
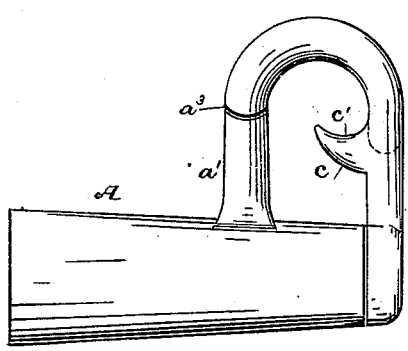
Figure 2:
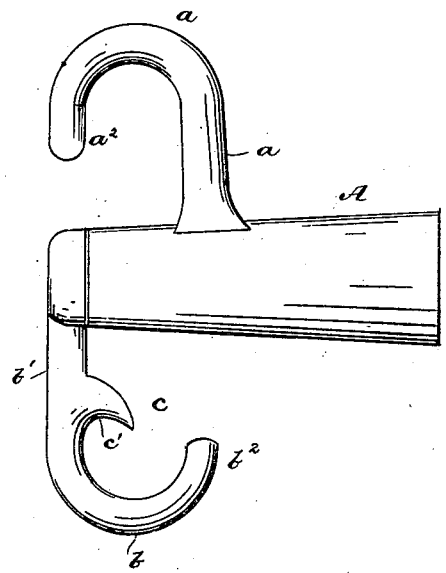
Figure 3:
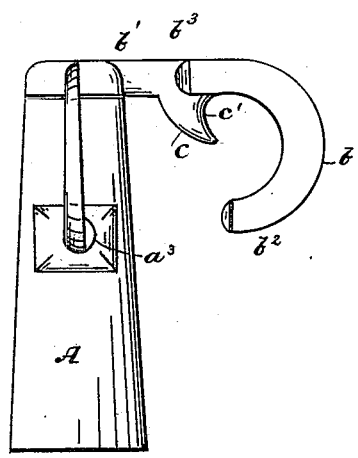
Figure 4:
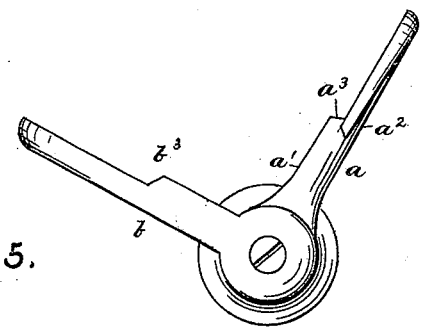
Figure 5:
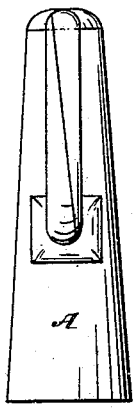

In the drawings, Figures 1 and 2 are side elevations of my invention, showing the loops closed and open. Figs. 3 and 4 are front views of it in a vertical position, showing it open and closed; and Fig. 5 is an end view of it when open.

A is a ferrule of well-known form. $a$ is an inner loop, fixed rigidly to the ferrule A, and $b$ is an outer loop, fixed or hinged to the end thereof, as shown.

The rigid loop $a$ is composed of the shank $a'$ and the hook $a^2$, which is turned outward and is flattened on its upper side, so as to form a shoulder, $a^3$, on its shank, as shown.

The loop $b$ is composed of the shank $b'$ and its hook $b^2$, the hook $b^2$ being constructed and arranged so that it will close snugly against the hook $a^2$ of the loop $a$. It has formed on its shank a shoulder, $b^3$, which, when the two loops are closed together, is flush with the top of the hook $a^2$.

$c$ is a guard affixed to the inner edge of the loop $b$, and projects inward and partially across the space between the loops $a$ and $b$. It is arranged so that its bearing-edge $c'$ is between the shoulder $b^3$ and the top of the loop $b$.

In the construction and arrangement of the several parts it will be seen that the point of the hook $a^2$ rests down on the shank against the shoulder $b^3$, between the bearing-edge $c'$ of the guard $c$ and the hinged end of the loop, so that the ring of the trace will be caught by the guard $c$ and prevented from passing beyond the point of the hook $a^2$. It will thus be seen that the trace-ring is prevented from acting on and lifting the loop $b$ from its position on the loop $a$.

It will be seen that I have here a device which is perfectly secure without the use of springs for holding the hinged loop. The weight of the loop $b$ will keep it constantly in contact with the loop $a$. If the trace-ring swings around on the shank of the loop $a$ it cannot become detached. If it swings on the loop $b$ it will be caught by the guard $c$, and prevented from passing inward beyond the end of the loop $a$, thus preventing it from getting into a position where it could lift the loop $b$ and become detached.

What I claim, and desire to secure by Letters Patent, is—

The combination of the hooks $a$ and $b$, the ends of which overlap, as described, the hook $a$ being fixed, while the hook $b$ is hinged to the ferrule A, and has a guard or spur, $c$, on its inner edge, arranged to project from a point opposite where the end $a^2$ of the hook $a$ closes down onto the shank of the said hook $b$, substantially as and for the purpose set forth.

In testimony that I claim the foregoing as my own I affix my signature in presence of two witnesses.

EDWARD HANRAHAN.

Witnesses:
G. EUGENE FARNUM,
CHAS. C. WHEELER.